US005741946A

United States Patent [19]
Wei

[11] Patent Number: 5,741,946
[45] Date of Patent: Apr. 21, 1998

[54] POLYETHER LUBRICANTS AND METHOD FOR THEIR PRODUCTION

[75] Inventor: Liwen Wei, Belle Mead, N.J.

[73] Assignee: Mobil Oil Corporation, Fairfax, Va.

[21] Appl. No.: 733,056

[22] Filed: Oct. 16, 1996

Related U.S. Application Data

[62] Division of Ser. No. 329,913, Oct. 27, 1994, Pat. No. 5,648,557.

[51] Int. Cl.$^6$ ................................................. C07C 43/11
[52] U.S. Cl. ............................................ 568/617; 568/613
[58] Field of Search ..................................... 568/613, 617

[56]     References Cited

U.S. PATENT DOCUMENTS

| 4,568,775 | 2/1986 | Aoshima et al. | 568/617 |
| 5,416,240 | 5/1995 | Weyer et al. | 568/617 |

*Primary Examiner*—C. Warren Ivy
*Assistant Examiner*—Lyman H. Smith
*Attorney, Agent, or Firm*—Malcolm D. Keen

[57]     ABSTRACT

Cyclic ethers are polymerized or copolymerized in homogeneous liquid phase using very low concentrations of heteropolyacid catalyst to produce essentially linear polyoxyalkylene polymers. The product of the polymerization contains less than 2 weight percent cyclic oligomer by-product and has a molecular weight distribution ($M_w/M_n$) between 1 and 2. Alcohols, acyl-containing compounds and alkalies can be used as end-caping groups to terminate polymerization or modify the properties of the polymer produced. The process produces novel polyoxyalkylene copolymers and block copolymers that are useful as lubricants. The copolymers have a high viscosity index and are compatible with mineral oil and synthetic hydrocarbon lubricants. Preferred comonomers are tetrahydrofuran, $C_2$–$C_{20}$ monoepoxides and oxetan.

22 Claims, No Drawings

POLYETHER LUBRICANTS AND METHOD FOR THEIR PRODUCTION

This is a division of application Ser. No. 08/329,913, filed on Oct. 27, 1994, now U.S. Pat. No. 5,648,557.

FIELD OF THE INVENTION

This invention relates to the production of polyether lubricants prepared by cationic polyrization or copolymerization of cyclic ethers using hetropolyacid catalysts. The invention particuiarly relates to the production of novel polyether lubricants that have a high viscosity index and narrow molecular weight distribution. The invention especially relates to copolymer polyether lubricants that are compatible with mineral oil.

BACKGROUND OF THE INVENTION

The use of polyether fluids is well known in applications such as hydraulic fluids, brake fluids, cutting oils and motor oils where the synthetic ability to structure properties such as water miscibility, fire resistance, lubricant properties and extreme pressure resistance provides a competitive advantage over other fluids. The polyether oils in practical use comprise polyalkylene glycols and their end-capped monoethers, diethers, monoesters and diesters. They include polyalkylene oxide polyether homopolymer, copolymer and block copolymer and can be prepared principally by the anionic polymerization or copolymerization of oxiranes or epoxides and other cyclic ethers. Small or large molecule end-capping groups are added in the polymerization to modify the properties of the resultant polyether as appropriate for the selected application.

Basic catalysts are generally employed in the art for the production of polyethers from cyclic ethers such as oxiranes because anionic catalysis produces a product with a substantially smaller or narrower molecular weight distribution than the product produced by cationic polymerization using conventional Lewis acids. Lewis acids are intrinsically of higher activity leading to extensive chain transfer and cyclic formation reactions. Also, effective acid catalysts for cyclic ether polymerization or copolymerization including liquid super acids such as fuming sulfuric acid, fluorosulfonic acid or $BF_3$/promoter catalysts are difficult to handle and are more troublesome to dispose of in an environmentally acceptable manner.

These activity and environmental issues are of great concern for the production of tetrahydrofuran-containing polyethers which employ acid catalysts. Substantial efforts in the prior art have been devoted to resolving these issues by preventing cyclic formations and by employing solid acid catalysts.

U.S. Pat. No. 4,568,775 describes a two phase process for the polymerization of tetrahydrofuran or a mixture of tetrahydrofuran and other cyclic ethers in contact with a heteropolyacid catalyst having 0.1 to 15 mol of water per mol of heteropolyacid catalyst present in the catalyst phase. The polyether glycols prepared from the process are useful as starting material for the production of urethane. The process uses large volumes of catalyst in the two phase process.

U.S. Pat. No. 4,988,797 polymerizes oxetan and tetrahydrofuran (THF) in the presence of excess alcohol in contact with acid catalyst wherein the molar ratio of acid catalyst to hydroxyl groups is between 0.05:1 and 0.5:1. The invention is particularly directed to the polymerization of oxetanes.

U.S. Pat. No. 5,180,856 teaches the polymerization of THF and glycidyl ether in the presence of alkanol to produce polyethers. Lewis acid catalyst is used such as boron trifluoride. The polymerization is carried out in the presence of 0.01–5 weight percent of Lewis acid catalyst. The products are useful as lubricants. The Lewis acid catalysts that are dissolved in the polyether-products have to be separated, destroyed and discarded as wastes.

U.S. Pat. No. 4,481,123 teaches the production of polyethers from TEF and alpha alkylene oxides having an alkyl radical containing 8–24 carbon atoms. The polymerization is carried out in contact with Lewis acid catalyst. The polymerization can further include $C_1$–$C_4$ epoxide and alcohol. The polyether products are useful as lubricants.

The object of the present invention is to produce polyethers that possess superior lubricant properties and are compatible with synthetic hydrocarbon motor oil and mineral oil.

Another object of the invention is to produce the foregoing oil-compatible polyesters using as a method heteropolyacid catalysis in a single phase in low concentration.

Yet a further object of the present invention is to produce block and/or random THF and epoxide copolymers that contain novel end groups and/or structural units to provide oil compatibility and superior lubricant properties.

SUMMARY OF THE INVENTION

Cyclic ethers have been polymerized and copolymerized in homogeneous liquid phase using very low concentrations of heteropolyacid catalyst to produce essentially linear polyoxyalkylene polymers. The product of the polymerization contains less than 2 weight percent cyclic oligomer by-product and has a molecular weight distribution ($M_w/M_n$) between 1 and 2. A variety of alcohols, acyl-containing compounds and nucleophiles can be used as end-caping groups to terminate polymerization or suitably modify the properties of the polymer produced. The process produces novel polyoxyalkylene copolymers and block copolymers that are useful as lubricants. The copolymers have a high viscosity index and are compatible with mineral oil and synthetic hydrocarbon lubricants. The preferred comonomers are tetrahydrofuran, $C_2$–$C_{20}$ monoepoxides and oxetan.

More particularly, the invention comprises a process for the polymerization of cyclic ether monomers for the production of polyoxyalkylene polymer involving the polymerization of at least one cyclic ether monomer in a homogeneous liquid phase reaction mixture in contact with 0.1–5 weight percent of a heteropolyacid catalyst, with or without solvents such as glymes or polar substances that dissolve the catalyst. The polymerization is carried out under conditions sufficient to produce polyoxyalkylene polymer or copolymer with less than 2 weight percent cyclic oligomer formation. Depending on reactants and polymerization conditions, polyoxyalkylene homopolymer, copolymer or block copolymer is produced.

Furthermore, the heteropoly acid catalyst is removed from the polyether products as alkali salts. The alkali salts can be acidified and reused.

Monomers useful in the invention have the structures:

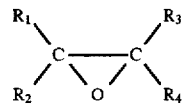

wherein $R_1$, $R_2$, $R_3$ and $R_4$, alike or different, are selected from the group consisting of hydrogen, $C_2$–$C_{20}$ alkyl, aryl, arylalkyl, and alkoxyalkyl; and

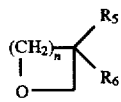

wherein n is an integer from 1 to 8 and $R_5$ and $R_6$, alike or different, are selected from the group consisting of hydrogen, $C_1$-$C_{20}$ alkyl, aryl, arylalkyl, and alkoxyalkyl.

The process produces a novel polyoxyalkylene block copolymer liquid lubricant compatible with synthetic hydrocarbon lubricants and mineral oil comprising the copolymer residue comprising recurring blocks of recurring alkylene oxide units formed by ring-opening addition polymerization of cyclic ether monomers. The monomers are selected from the group having the structures as disclosed immediately above. The block copolymers have a molecular weight between 250 and 10,000, molecular weight distribution ($M_w/M_n$) between 1 and 2, viscosity index of at least 180 to 400 for low molecular weight, contain less than 2 weight percent cyclic polyoxyalkene oligomer, and have at least a 5 weight percent solubility in mineral oil or synthetic oil.

A preferred block copolymer comprises polyoxyalkylene block copolymer having the structure A—B—A, wherein A and B comprise recurring $C_2$+ alkylene oxide monomer or comonomer units to provide copolymer or homopolymer blocks.

Preferably, A comprises recurring units of substituted or unsubstituted oxyethylene or tetrahydrofuran and B comprise polyether glycols comprising $C_2$+ alkyiene oxide monomer or comonomer units.

DETAILED DESCRIPTION OF THE INVENTION

The term cyclic ether as applied to the present invention includes all completely saturated heterocycles having oxygen as the hetero-element. These include epoxide or oxiran, trimethylene oxide or oxetan, tetramethylene oxide or tetrahydrofuran (TEF), and pentamethylene oxide or tetrahydropyran, wherein all of the forgoing ethers may be substituted or unsubstituted. The preferred cyclic ethers employed in the present invention are THF and epoxides of $C_3$-$C_{20}$ alpha olefins, referred to as alpha epoxides. In general, the cyclic ethers have the structures

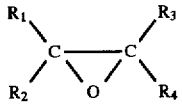

wherein $R_1$, $R_2$, $R_3$ and $R_4$, alike or different, are selected from the group consisting of hydrogen, $C_2$-$C_{20}$ alkyl, aryl, arylalkyl, and alkoxyalkyl; and

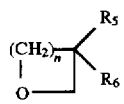

wherein n is an integer from 1 to 8 and $R_5$ and $R_6$, alike or different, are selected from the group consisting of hydrogen, $C_1$-$C_{20}$ alkyl, aryl, arylalkyl, and alkoxyalkyl.

Cyclic ether monomers polymerize or copolymerize by ring-opening polymerization to yield polyoxyalkylene polymers or copolymers. Acid or basic catalysts can be used to initiate polymerization. However, acid catalysts such as Lewis acids usually lead to greater polydisperity in the product whereas basic catalysts produce substantially narrower polydispersity. A key discovery of the process of the present invention is the finding that cyclic ethers can be polymerized to polyoxyalkenes having a narrow molecular weight distribution when the polymerization is initiated with low concentrations of certain heteropolyacid catalysts.

Heteropolyacid catalysts useful in the present invention are described in "Metal Oxide Chemistry in Solution: The Early Transition Metal Polyoxoanions" by V. W. Day and W. G. Klemperer in Science, Vol. 228, Number 4699, May 3, 1985. The heteropolyacid catalysts comprise mixed metal oxide heteropolyacids having the formula $H_xM_yO_z$ wherein H is hydrogen, M is metal selected from Group IA, IIA, IVA, IVB, VA, VB, VIA or VIB of the Periodic Table of the Elements, O is oxygen, x is an integer from 1 to 7, y is an integer from of at least 1 and z is an integer from 1 to 60; wherein a mole of said catalyst contains between 0 and 30 moles of water of hydration. Preferred catalysts are those where M comprises at least one of molybdenum, tungsten or vanadium. Particularly preferred catalysts comprises heteropolytungstic acid having the formula $H_4PW_{21}O_{40}$, $H_4SiW_{12}O_{40}$, $H_3PMo_{12}O_{40}$ and $H_4PMo_{12}O_{40}$. The most preferred catalyst has the formula $H_3PW_{12}O_{40}$. Other heteropolyacids representative of those useful in the invention include:

12-molybdophosphoric acid, 5-molybdo-2-phosphoric acid, 12-tungstophosphoric acid, 12-molybdotungstophosphoric acid, 6-molybdo-6-tungstophosphoric acid12-molybdovanadophosphoric acid, 12-molybdosilicic acid, 12-molybdotungstoboric acid, 9-molybdonickelic acid, 6-tungstocobaltic acid, 12-tungstogermanic acid, and the like.

A distinctive feature of the process of the invention is the discovery that the polyoxyalkylene polymers of the invention are effectively formed in a system comprising a single liquid phase containing low concentrations of heteropolyacid catalyst between 0.1 and 5 weight percent. Surprisingly, the process is essentially insensitive to the amount of water in the system. A mole of untreated heteropolyacid in its native state typically contains a substantial number of moles of water of hydration which may exceed 30 moles, depending on the acid. Regardless of the degree of hydration, the heteropolyacid catalyst is effective in the cyclic ether polymerization process of the invention where dry catalyst or catalyst containing in excess of 15 moles of water per mole of catalyst can be used.

The novel polymerization process is carried out at temperature between −40° C. and 120° C. for a time sufficient to complete the polymerization. Preferably, the polymerization is carried out neat, although non-reactive solvents can be used to conduct the polymerization in the preferred single liquid phase. When the polymerization is complete, the mixture is treated with aqueous alkali, preferably aqueous alkali metal carbonate, to quench the reaction. Spent catalyst is recovered by filtration, reconstituted and reused.

Various initiation, chain transfer, and termination agents are used in the process as necessary to control molecular weights and to provide desirable end capping groups. Such agents can be selected from any nucleophile known in the art. For example, water, acetic anhydride, alcohols and alkyl orthoformate can be employed to regulate molecular weight of polymers or copolymers, and to end-cap terminal hydroxy groups as esters or ethers.

Feed solutions used in the following examples were prepared as specified in table 1. Cyclic ether monomers used were anhydrous grades. Commercial hydrated heteropolyacid catalysts (contained 20 to 30 hydrated) were used as received or dried in vacuum (120° C./3 hr) or calcined (250° C., overnight) prior to use.

The following Examples 1–4 are presented to illustrate the process and application of the present invention for the copolymerization of THF with epoxides. The polymerizations described in Examples 1–4 were conducted using the feed compositions listed in Table 1.

TABLE 1

| Example: | 1 | 2 | 3 | 4 |
|---|---|---|---|---|
| Feed Composition | | | | |
| THF, ml | 150 | 240 | 100 | 250 |
| PO, ml | 175 | 110 | 100 | — |
| BO, ml | — | — | — | 250 |
| AA, ml | 2 | 2 | 0 | 0 |
| TMO, ml | 0 | 0 | 7.5 | 0 |
| Experimental | | | | |
| HPW, g | 1.5 | 1 | 0.5 | 1.5 |
| Rx Temp, °C. | 65 | 35 | 70 | 80 |

1-THF = tetrahydrofuran,
PO = propylene oxide,
BO = butylene oxide,
AA = acetic anhydride,
TMO = trimethyl orthoformate.

EXAMPLE 1

To a flask containing heteropolyacid catalyst ($H_3PW_{12}O_{40}10H_2O$, dried in vacuum) was added a feed solution composed of tetrahydrofuran, propylene oxide, and acetic anhydride. During the time of addition of the feed the temperature was allowed to rise to 50° C. The remaining feed solution was fed into the above solution at a rate sufficient to maintain the reaction temperature at 65° C. After the addition, the solution was allowed to cool to ambient temperature and quenched with 0.5 ml of an aqueous solution of 20% sodium carbonate. The resulting mixture was filtered to remove insoluble salts containing spent catalyst and vacuum-stripped to remove light ends. A copolymer of tetrahydrofuran and propylene oxide was recovered in 91% yield based on monomer used and analyzed by NMR, IR and GPC. The product viscometric properties were Kv@ 100=32 Cst, 208 viscosity index (VI), and less than −45° C. pour point.

EXAMPLE 2

Following the procedure described in Example 1, a high viscosity copolymer of tetrahydrofuran and propylene oxide was prepared in 87% yield. Viscometric properties were 609 Cst, 324 VI, and −10° C. pour point.

EXAMPLE 3

The procedure described in Example 1 was followed except that 20 ml of initial feed was used, a low viscosity copolymer of tetrahydrofuran and propylene oxide was prepared in 95% yield. The viscometric properties were 13 Cst, 227 VI, and less than −49° C. pour point.

EXAMPLE 4

Following the procedure described in Example 1, a copolymer of tetrahydrofuran and butylene oxide was prepared in 86% yield. The viscometric properties were 25 Cst, 165 VI, and −45° C. pour point.

The following Example 5 demonstrates the copolymerization of THF and propylene oxide with heteropolyacid catalyst in the presence of low molecular weight THF oligomer whereby a block copolymer is produced. Example 6 illustrates the process of the invention using a low molecular weight alcohol as chain terminating agent.

EXAMPLE 5

To a flask containing 2 grams of heteropolytungstic acid and 250 grams of THF oligomers (250 MW) was added a solution of tetrahydrofuran (433 grams) and propylene oxide (360 grams). An exothermic reaction took place raising the temperature to 60° C. An ice batch was used to maintain this temperature throughout the entire addition. After the addition, the solution was quenched with 1 gram of 20% sodium carbonate. The resulting mixture was filtered to remove insoluble salts containing spent catalyst and vacuum-stripped to remove light ends. A copolymer of tetrahydrofuran and propylene oxide was prepared in 96% yield with Kv@ 100=14cSt.

EXAMPLE 6

The procedures as described in Example 5 were followed except 2-ethylhexanol alcohol (130 grams) was used as the in situ capping agent. The feed was a solution containing 160 grams of THF and 160 grams of butylene oxide (BO). THF/BO polyether products had an average MW of 300. GC showed no cyclic oligomers formed.

Table 2 presents GPC data and cyclic oligomer content for the polymers prepared in Examples 5 and 6 and compares these results with prior art polymers (BASF and U.S. Pat. No. 4,638,097 (THF polyether) and U.S. Pat. No. 2,801,578 (THF/alkylene oxide polyether).

TABLE 2

| GPC Data (universal calibration) | | | | |
|---|---|---|---|---|
| | Kv @ 100 C | Mw | Mn | Mw/Mn |
| Example 5, THF/PO polyether | 14 | 1013 | 1096 | 1.08 |
| Comparative THF/EO polyether | 43 | 1585 | 2710 | 1.72 |
| Comparative THF polyether | solid | 2020 | 5770 | 2.86 |
| Cyclic oligomer formation | | | | |
| | Cyclic oligomers | | Ave MW | |
| Example 5 | <2% | | 1000 | |
| Example 6 | 0% | | 300 | |
| Comparative THF polyether | 2–5% | | 400 | |
| Comparative THF/AO polyether | 20% | | | |

EXAMPLE 7

To a solution of THF (8.1 grams), butylene oxide (9.4 grams) and water (0.30 grams) was added a HPW catalyst containing 28 hydrates (0.46 grams). A one-phase solution was formed and an immediate exothermic reaction was noted which took less than 15 seconds to reach 30° C. At 30° C., an additional 2.2 grams of water was added to the system. The temperature was maintained for at least 10 min before it began to drop, during which time the one-phase solution became more viscous due to copolymerization.

EXAMPLE 8

Example 7 was repeated using 2.5 grams of water.

EXAMPLE 9

A two phase reaction was carried out according to the procedures described in Example 7, except that 3.1 grams of HPW catalyst and 1.20 grams of water were used to form the catalyst phase. Under rapid stirring, no exothermic reaction was observed.

The results for the comparison of one-phase polymerization of the invention of Examples 7 and 8 versus two phase polymerization of Example 9 are presented in Table 3.

TABLE 3

One-phase versus two phase

| water (g) | HPW* (g) | Mole ratio** | Phase | Induction period |
|---|---|---|---|---|
| 0.30 | 0.46 | 160 | 1 phase | 15 s (20–30° C.) |
| 2.50 | 0.46 | 1086 | 1 phase | mild exotherm |
| 1.20 | 3.10 | 100 | 2 phases | indefinitely |

*HPW = heteropolytungstic acid catalyst contained 28 hydrates
**Mole ratio = [water]/[HPW]

A particular embodiment of the invention includes the preparation of block copolymers by polymerization of a mixture of cyclic ethers and one or more oligomer containing terminal active hydrogen moieties. The block copolymerization is catalyzed by 0.10 to 5 weight percent heteropolyacid in a single liquid phase. Any of the cyclic ethers monomers, alone or in combination as comonomers, described herein before may be used in the preparation of the block copolymers of the invention. As to the oligomer, it should be selected from oligomeric materials that are soluble in the polymerization mixture and contain at least one but preferably two terminal active hydrogens.

Particularly preferred oligomers for block copolymerization are oligomeric glycols, especially oligomeric polytetramethylene oxide glycol. Others useful oligomeric glycols include polyethylene oxide glycol, polypropylene oxide glycol and polyester glycols such as polyethylene adipate glycol. These and other oligomeric glycols result in the production of block copolymers having the structure A—B—A when polymerization is carried with cyclic ethers according to the process of the invention.

In the block copolymer structure A—B—A, the B segment corresponds to the oligomeric glycol moiety and the A segment is the polyether moiety produced from the polymerization of cyclic ethers in the presence of the oligomeric glycol. For example, for the polymerization of a mixture of THF and propylene oxide (PO) in solution with polytetramethylene glycol, the product has the following structure where the A segment is THF/PO copolymer and the B segment is polytetramethylene glycol oligomer residue:

GPC analyses of block copolymers of the invention prepared using heteropolytungstic acid containing five hydrates revealed that these block copolymers contained low cyclic oligomer contents (<1%) and exhibited narrow molecular weight distributions (MWD, Viscometry detector: 1.09 to 1.96, see Table 4 below). For example, a block copolymer of the invention shown as Example 10 in Table 4, an ISO 680 grade TEF/EO/BO block copolymer, had essentially no cyclics and MWD of 1.96. On the other hand, Polyram 460, an ISO 460 grade Bayer AG's THF/EO/PO fluid, had significant amounts of cyclics and MWD=3.7. Lubricant properties of Example 10 are Kv @ 100° C. of 97 cS, Kv @ 40° C. of 741 Cst, viscosity index of 225 and pour point of −39° C.

TABLE 4

GPC Analysis of THF/AO block copolymers

| Fluid | Composition | GPC* · VI | | | RI | | |
|---|---|---|---|---|---|---|---|
| Ex. 10 | THF/BO THF/EO | 2912 | 5695 | 1.96 | 3256 | 7753 | 2.38 |
| B block of 10 | THF/EO | 1585 | 2710 | 1.70 | 1437 | 3296 | 2.73 |
| Ex. 11 | THF/PO THF | 1897 | 2068 | 1.09 | 876 | 1155 | 1.32 |
| B block of 11 | THF | | 250 | >2** | | | |
| Polygram 460 | THF/EO/BO | 2002 | 7399 | 3.70 | 2115 | 9175 | 4.34 |

*GPC detector: VI: Viscometry, RI: Refractive Index
**GPC remained to be determined The process of the invention provides a very useful synthesis of polyether fluids. Its ability to copolymerize tetrahydrofuran and epoxides results in new polyether fluids with unique oil-compatibility not attainable in conventional polyether fluids. These new fluids can be of great utilities for synthetic lubrication to provide low friction/traction, therefore fuel economy in automotive or industrial lubricant application.

What is claimed is:

1. A process for the polymerization of cyclic ether monomers for the production of polyoxyalkylene polymer lubricants, said process comprising:

polymerizing at least one of said cyclic ether monomers in a reaction mixture consisting essentially of a single homogeneous liquid phase of said monomers and 0.1 to 5 weight percent of a hydrated or anhydrous heteropolyacid catalyst, wherein said process is carried out under conditions sufficient to produce said polyoxyalkylene polymer with yields of said lubricants of at

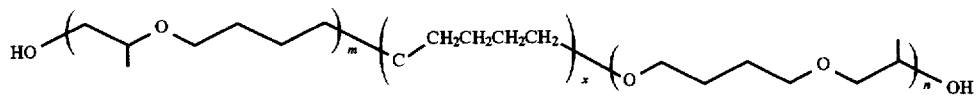

The polyoxyalkylene block copolymer having the structure A—B—A, comprises polyether glycols comprising $C_2$+ alkylene oxide units for the B block and A comprises recurring units of substituted or unsubstituted oxyalkylene, preferably oxyethylene with tetrahydrofuran. The block copolymers have a molecular weight between 250 and 10,000, molecular weight distribution ($M_w/M_n$) between 1 and 2, viscosity index of 180–400, preferably at least 200, at least 5 weight percent solubility in mineral oil and synthetic oil; and contain less than 2 weight percent cyclic polyoxyalkene oligomer.

least 80 weight percent and with less than 2 weight percent cyclic oligomer formation.

2. The process of claim 1 wherein at least two cyclic ether comonomers are polymerized whereby said polyoxyalkylene polymer comprises polyoxyalkene copolymer.

3. The process of claim 2 wherein said copolymer comprises polyoxyalkylene block copolymer.

4. The process of claim 1 wherein said monomers have the structures:

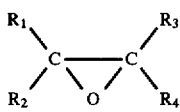

wherein $R^1$, $R^2$, $R_3$ and $R^4$, alike or different, are selected from the group consisting of hydrogen, $C_1$–$C_{20}$ alkyl, aryl, arylalkyl, and alkoxyalkyl; and

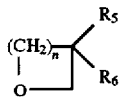

wherein n is an integer from 1 to 8 and $R_5$ and $R_6$, alike or different, are selected from the group consisting of hydrogen, $C_1$–$C_{20}$ alkyl, aryl, arylalkyl, and alkoxyalkyl.

5. The process of claim 1 wherein said cyclic ether monomer comprises tetrahydrofuran.

6. The process of claim 2 wherein said comonomers comprise tetrahydrofuran and substituted or unsubstituted oxirane.

7. The process of claim 1 wherein said cyclic ether is selected from the group consisting of ethylene oxide, propylene oxide, butylene oxide, oxiran and $C_5$–$C_{20}$ oxirane.

8. The process of claim 7 wherein said $C_5$–$C_{20}$ oxirane comprises alpha olefin epoxide.

9. The process of claim 1 wherein said heteropolyacid catalyst comprises mixed metal oxide heteropolyacids having the formula $H_xM_yO_z$ wherein H is hydrogen, M is metal selected from Group IA, IIA, IVA, IVB, VA, VB, VIA or VIB of the Periodic Table of the Elements, O is oxygen, x is an integer from 1 to 7, y is an integer of at least 1, and z is an integer from 1 to 60; wherein a mole of said catalyst contains between 0 and 30 moles of water of hydration.

10. The process of claim 9 wherein M comprises at least one of molybdenum, tungsten or vanadium.

11. The process of claim 9 wherein said catalyst comprises heteropolytungstic acid having the formula $H_3PW_{12}O_{40} \cdot 10H_2O$.

12. The process of claim 1 including the further steps of quenching said polymerization reaction mixture with aqueous alkali and filtering the quenched mixture to recover spent catalyst.

13. The process of claim 12 wherein said aqueous alkali comprises aqueous alkali metal carbonate.

14. The process of claim 1 including the further step of carrying out said polymerization in the presence of a chain terminating agent.

15. The process of claim 14 wherein said chain terminating agent comprises polyalkylene oxide oligomer 16. The process of claim 15 wherein said oligomer comprises polytetrahydrofuran.

17. The process of claim 14 wherein said chain terminating agent comprises $C_1$–$C_{20}$ alkanol.

18. The process of claim 14 wherein said terminating agent comprises $C_1$–$C_{20}$ carboxylic acid anhydride.

19. The process of claim 14 wherein said chain terminating agent comprises trimethyl orthoformate.

20. The process of claim 1 wherein said polymerization comprises temperature between 0° C. and 120° C. for a time sufficient to complete said polymerization.

21. The process of claim 1 wherein said polymerization is carried out neat.

22. The process of claim 9 wherein a mole of said catalyst contains at least 16 moles of water of hydration.

* * * * *